Jan. 20, 1953   J. E. SAMPSON   2,625,724
SAFETY PIN
Filed Oct. 16, 1950

INVENTOR.
JULIAN E. SAMPSON
BY
ATTORNEY

Patented Jan. 20, 1953

2,625,724

UNITED STATES PATENT OFFICE 2,625,724

SAFETY PIN

Julian E. Sampson, St. Louis, Mo.

Application October 16, 1950, Serial No. 190,386

1 Claim. (Cl. 24—156)

This invention relates to the so-called safety pins. It is an object of my invention to provide a safety pin that is more safe to use without sacrificing any of the advantages afforded by the safety pin now in general use.

A further object of my invention is to provide a safety pin whose point is always shielded unless forcibly held open.

A further object of my invention is to provide a safety pin that would not prove dangerous if, by accident, it would be swallowed by an infant.

These and such other objects of my invention as may hereinafter appear will be best understood from a description of the embodiments thereof shown in the accompanying drawings in which.

Figure 1:
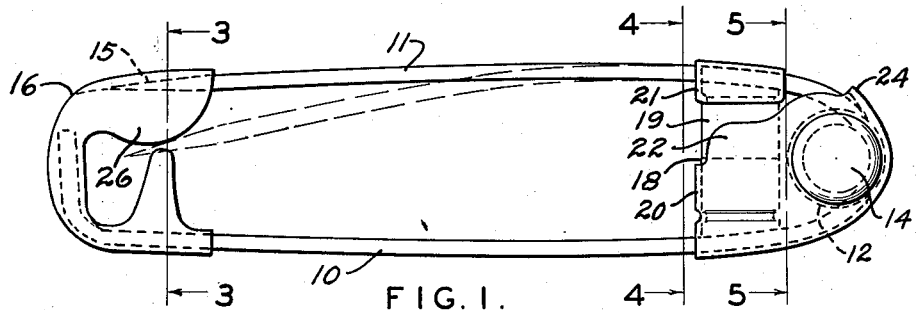
Fig. 1 is a side elevation of my safety pin in closed position.

My safety pin as shown in Fig. 1 has a pair of relatively stiff non-magnetic wire arms 10 and 11 and one end of each arm is formed with an eye 12—13 respectively through which a rivet 14 is passed to form a hinge. The outer end of arm 11 is provided with a point 15 while the outer end of arm 10 is provided with a latch 16 under which the point 15 is latched against outward movement.

Figure 2:
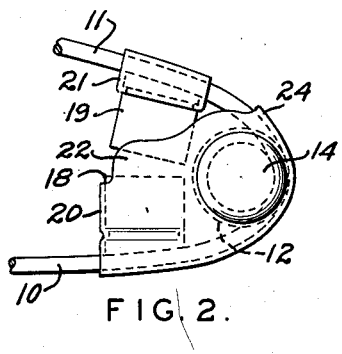
Fig. 2 is a side elevation of the hinged portion of the pin in open position.
Figure 4:
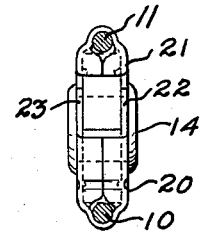
Fig. 4 is a sectional view of the pin taken substantially on line 4—4 in Fig. 1.

A pair of magnets 18 and 19 with opposing poles are secured to the arms 10 and 11, respectively, by non-magnetic clips 20 and 21. The magnets 18 and 19 tend to hold the arms 10 and 11 in closed position. The side walls of non-magnetic clip 20 are extended as at 22 and 23 and act as guides for magnet 19 as the arms 10 and 11 are moved from open to closed position. Clip 20 snugly encases the eyes 12 and 13 and is held by rivet 14. Clip 20 is flared as at 24 to form an abutment for limiting the opening movement of arm 11 as shown in Fig. 2.

Figure 3:
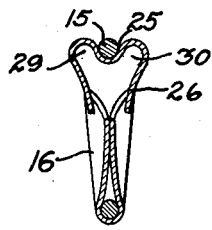
Fig. 3 is a sectional view of the pin taken substantially on line 3—3 in Fig. 1.

To open my pin enough force must be exerted on the arms 10 and 11 to overcome the pull of the magnets 18 and 19 and when the arms are released the magnets 18—19 bring the arms to closed position as shown in Fig. 1 with the point 15 lying in the depression 25 that is provided in the outer surface of latch 16 and is clearly shown in Fig. 3.

To lock my pin, pressure is applied to arm 11 to force the pointed end 15 under the lips 26 of the skirt portion of the latch 16. It will be seen that since the magnets 18 and 19 are abutting as in Fig. 1 the arm 11 must bend between the magnet 19 and the point 15. When the pressure on arm 11 is released the arm 11 will straighten and the pointed end will rest in either recess 29 or 30 of the latch 16.

Figure 6:
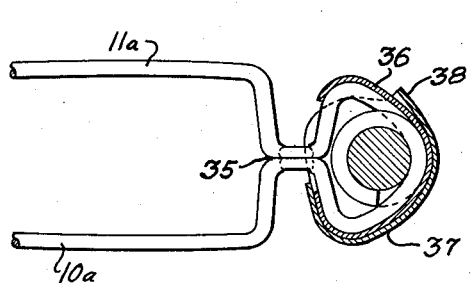
Fig. 6 is a view similar to Fig. 2 with a portion broken away and showing a modification of the invention.
Figure 5:
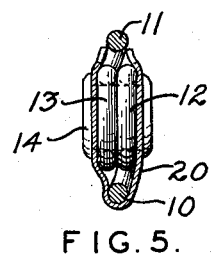
Fig. 5 is a sectional view of the pin taken substantially on line 5—5 in Fig. 1.

Fig. 6 shows a modification of my invention in which the arms 10a and 11a are formed to abut as at 35 when the arms are in closed position. A spring 36 under tension embraces the hinged ends of arms 10a and 11a and is held in place by the clip or guard 37. The clip 37 is flared as at 38 to limit the opening movement of arm 11a.

The spring 36 has the same function as the magnet above described in that it returns the arms 10a and 11a from open position to closed position.

The invention may be modified in various respects as will occur to those skilled in the art and the exclusive use of all modifications as come within the scope of the appended claim is contemplated.

I claim:

In a safety pin, a pair of arms hinged together at one end, one being pointed, a latch on the outer end of the other arm, a recess in the outer surface of said latch for shielding the point of said pointed arm when said arms are in normally closed position and magnets attached to said arms for holding said pointed arm in position in said recess.

JULIAN E. SAMPSON.

REFERENCES CITED

The following references are of record in the file of this patent:

UNITED STATES PATENTS

| Number | Name | Date |
|---|---|---|
| 357,891 | Bailey | Feb. 15, 1887 |
| 389,037 | Wilkinson | Sept. 4, 1888 |
| 842,600 | Willis | Jan. 29, 1907 |
| 913,560 | Pittman | Feb. 23, 1909 |
| 2,145,313 | Morley | Jan. 31, 1939 |
| 2,246,495 | Alessi | June 24, 1941 |
| 2,297,806 | Smith | Oct. 6, 1942 |

FOREIGN PATENTS

| Number | Country | Date |
|---|---|---|
| 395,459 | France | Dec. 28, 1908 |
| 662,385 | France | Mar. 19, 1929 |